Aug. 10, 1926.
L. BASSANI
1,595,065
HALFTONE SCREEN ADJUSTING APPARATUS FOR CAMERAS
Filed Oct. 31, 1925
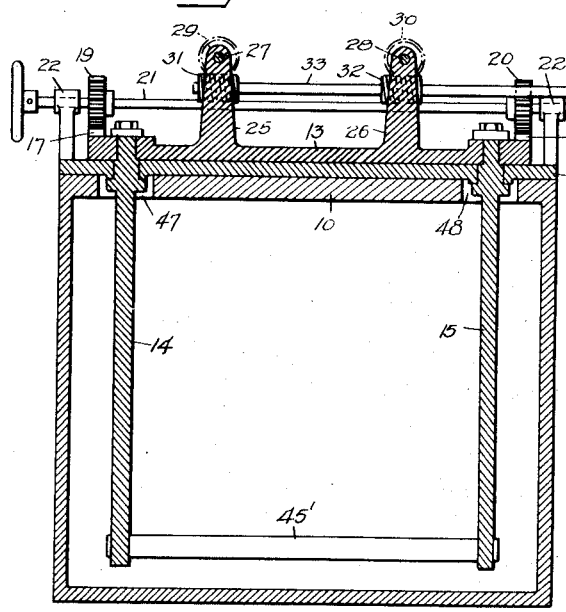
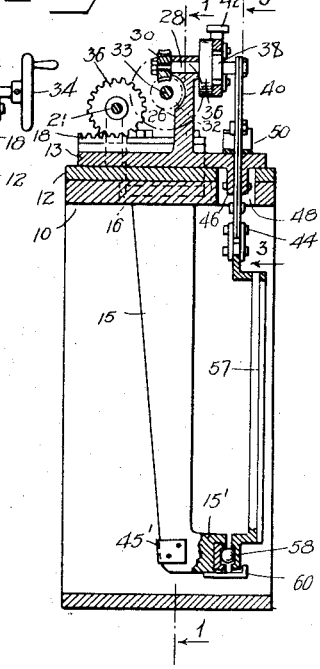
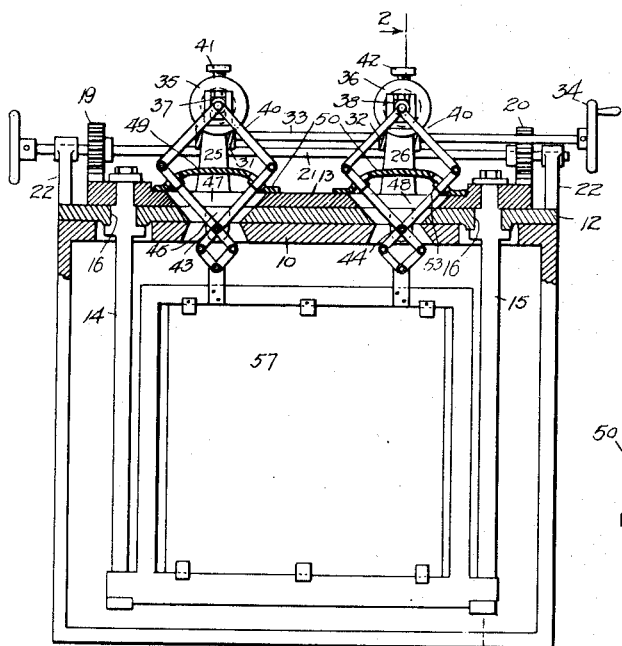
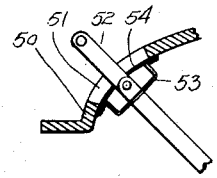
Laurent Bassani
INVENTOR
By his Attorney Patented Aug. 10, 1926.

1,595,065

UNITED STATES PATENT OFFICE.

LAURENT BASSANI, OF PARIS, FRANCE, ASSIGNOR TO BASSANI PROCESSES, INCORPORATED, OF NEW YORK, N. Y., A CORPORATION OF NEW YORK.

HALFTONE-SCREEN-ADJUSTING APPARATUS FOR CAMERAS.

Application filed October 31, 1925, Serial No. 65,969, and in France December 8, 1924.

This invention relates to process photographic apparatus and has reference particularly to a device for mounting cross-ruled screens in a camera and for permitting measured displacement of the screen in its own plane and also in a plane parallel to the optical axis of the apparatus.

The invention has for its object to provide an apparatus of this character, which performs its operations with great precision, and which may be installed in any of the modern types of process cameras without seriously modifying their construction. I accomplish this object by means of a device comprising a screen frame, suspended from a series of pantographs which receive their support from a carriage movable in a direction parallel to the optical axis of the lens and arranged on a stationary base member, the latter being preferably the upper wall of the camera box.

The adjustable carriage supports the pantographic mechanism controlling the vertical displacement of a frame and screen, such mechanism comprising depending brackets supporting the frame at its base. The stationary base is provided with a controlling mechanism for effecting displacement of the carriage, and, openings receiving the brackets and depending portions of the pantographs.

One embodiment of my invention is illustratively exemplified in the accompanying drawings in which Figure 1 is a transverse sectional view of a process camera equipped with a device constructed in accordance with the invention, the view being taken on the lines 1—1 of Figure 2; Figure 2 is a longitudinal sectional view of the rear portion of the camera taken on lines 2—2 of Figure 1; Figure 3 is an end view with parts shown in section and taken on lines 3—3 of Figure 2; and Figure 4 is a detail view of a device for preventing light from entering the camera through openings made in a portion thereof to accommodate moving parts of the apparatus.

Referring to the drawings, 10 denotes a camera and more particularly its upper wall. Mounted on the wall 10 is a stationary base 12, preferably of cast iron plate which supports a movable carriage 13. Two brackets 14 and 15, project downwardly from the under side of the carriage 13, into the camera 10 through openings 16 in the base 12, the walls of the openings 16 being of a size to closely embrace the brackets to prevent transverse play thereof. This construction gives perfect guidance to the carriage 13 in a direction parallel to the optical axis of the camera. The lower ends of the brackets 14 and 15 are attached to opposite ends of the cross bar 45'.

Mounted on the carriage 13 and arranged longitudinally and at each side thereof are two racks 17 and 18 which engage respectively pinions 19 and 20 mounted on a shaft 21 journalled in bearings 22 projecting upwardly from the stationary base 12.

The upper face of the carriage is provided with spaced supporting arms 25 and 26 having axles 27 and 28 respectively, mounted in their upper ends and projecting longitudinally of the machine. At one side of the supporting arms the axles 27 and 28 carry, respectively, pinions 29 and 30 engaging worms 31 and 32 respectively, which are carried by a shaft 33 operated from one side of the apparatus by means of a hand wheel 34. On the opposite side of the supporting arms the axles 27 and 28 carry disc plates 35 and 36, respectively, the plates being provided with grooves to accommodate slide blocks 37 and 38, the slide blocks 37 and 38 supporting pantographs 39 and 40, respectively, in depending position.

The screws 41 and 42 are carried by the plates 35 and 36 and are adjustable in the blocks 37 and 38, respectively, to cause the latter to slide relatively of the plates, thus changing the shape of the pantographs, while the rotation of the hand wheel 34 makes it possible to regulate the inclination of the grooves supporting the said slide blocks.

The stationary axis of the pantographs are denoted 43 and 44 and are supported by loops 45 and 46 projecting downwardly from the under surface of the carriage 13. The carriage 13, the base 12, and the upper wall 10 of the camera are provided with suitable openings 47 and 48 to accommodate the loops 35 and 36, respectively, of the pantographs.

In order to prevent light from entering the camera by way of the openings 47 and 48 the latter are provided with covers 49 and 50, respectively, which covers are made preferably of sheet metal, and referring particularly to Figure 4, it will be clear that each of the covers is provided with a slit 51 to accommodate a pantograph arm 52, the latter carrying a stirrup shaped mounting 53 the open side of which carries an edging of cloth or felt 54. The felt 54 is disposed over the slit 51, the latter being arranged in a part of the cover 49 which is concentric with the pivotal axis 43 of the arm 52.

A frame 56 which carries the cross-ruled screen 57 is suspended from the movable lower axis of the pantograph, the frame having a mid-portion extended towards the rear of the camera (see Figure 2) in such a manner that, under the action of gravity its lower portion is disposed adjacent the lower portions, 14' and 15' projecting from brackets 14 and 15, respectively. Suitable ball bearings 58 arranged between the adjacent portions of the two members are disposed to insure uniform movement of the frame 56 with respect to the brackets. Right angle pieces 59 and 60 carried by the projection 14' and 15' prevent the frame 56 from moving away from the brackets a distance greater than the diameter of the balls 58.

A device constructed in accordance with the present invention renders possible great precision in the adjustment of the positioning of the cross ruled screen, as a consequence of the direct suspension of this frame from the lower axis of the pantographs and further in consequence of the constant support rendered the frame by the rigid brackets 14 and 15.

What I claim and desire to secure by Letters Patent is:—

1. In combination, a camera, a screen and a holder arranged within said camera, and means disposed outside of the camera and operatively connected with said holder for imparting continuous movement to the latter in the plane of the screen and for imparting movement to the holder in a direction parallel to the optical axis of the camera.

2. In combination, a camera, a screen and a holder arranged within said camera, means operating outside the camera for imparting continuous movement to said holder and screen in the plane of the latter, and means supporting the first means and projecting into the camera to support said holder.

3. In combination, a camera, a screen and a holder arranged within said camera, means operating outside the camera to move said holder in a continuous path in the plane of the screen, means operating to adjust the first means parallel to the optical axis of the camera, and means carried by the second means and projecting into the camera to support the holder at its free end.

4. In combination, a camera, a screen and a holder arranged within said camera, a plate attached to a wall of the camera, a carriage slidable over said plate, means operating to adjust the carriage relatively to the plate, and in a direction parallel with the optical axis of the camera, and means operating from the carriage to support and move the frame in the plane of the said screen.

5. In combination, a camera, a screen and a holder arranged within said camera, a plate attached to an outside wall of the camera, a carriage on said plate, means for adjusting the carriage relatively of the plate and in a direction parallel to the optical axis of the camera, means operating to displace the holder in the plane of the screen, comprising rotary members, adjustable blocks carrier by said members, and a pantographic arrangement attached at one end to the blocks and at the other to the frame, and brackets carried by the carriage and depending into the camera to support the free end of the frame.

6. In combination, a camera, a screen and holder arranged within said camera, a supporting plate attached to an outside wall of the camera, a carriage adjustable over the plate and parallel to the optical axis of the camera, a pantographic device supported on the carriage and operating to displace the holder in the plane of the screen, a part of said device projecting through openings in the plate and carriage to engage the holder, and means carried by the carriage and disposed over said openings to prevent light entering the camera therethrough.

7. In combination, a camera, a screen and holder arranged within said camera, a base plate attached to the outer side of a camera wall, a carriage movable over said plate in a direction parallel to the optical axis of the camera, said carriage being provided with brackets projecting through openings in the base and camera, a system of levers projecting through other openings in the carriage and plate to support the frame, means for operating the levers to displace the holder in the plane of the screen, means disposed over the latter openings and carried by the carriage to embrace the levers and prevent light entering the interior of the camera, and bearings disposed between the brackets and lower end of holder to support the latter during movement thereof.

In testimony whereof I affix my signature.

LAURENT BASSANI.